United States Patent [19]

Murayama et al.

[11] 4,097,251

[45] Jun. 27, 1978

[54] METHOD OF FILTERING A STICKY MATERIAL-CONTAINING EXHAUST GAS

[75] Inventors: Takao Murayama, Yokoyama; Seiichi Shimizu, Tokyo; Takeo Miyakawa, Kawasaki, all of Japan

[73] Assignee: Taisei Kensetsu Kabushiki Kaisha & Tokyo Gas Co., Ltd., Tokyo, Japan

[21] Appl. No.: 778,421

[22] Filed: Mar. 17, 1977

[30] Foreign Application Priority Data

Apr. 14, 1976 Japan .................................. 51-41990

[51] Int. Cl.² .............................................. B01D 46/00
[52] U.S. Cl. ........................................ 55/97; 55/262
[58] Field of Search ............................ 55/97, 98, 262

[56] References Cited

U.S. PATENT DOCUMENTS

| | | | |
|---|---|---|---|
| 2,875,844 | 3/1959 | Pring | 55/97 |
| 3,998,933 | 12/1976 | Henderson, Jr. et al. | 55/98 |
| 4,010,013 | 3/1977 | Murayama | 55/350 |

*Primary Examiner*—Bernard Nozick
*Attorney, Agent, or Firm*—Wenderoth, Lind & Ponack

[57] ABSTRACT

Method of treating a sticky material-containing exhaust gas to remove the sticky material therefrom, by introducing pulverized coal or coke having a particle size of 0.3mm or less into the bottom of a hopper, which is positioned below, and integrally connected with, a bag-house containing bag-filters, to form a protective layer of pulverized coal or coke having a thickness of at least 1mm on the surface of each bag-filter, and then introducing the sticky material-containing exhaust gas into said hopper in a manner such that the gas passes through said protective layer while said protective layer captures and retains the sticky material.

8 Claims, 3 Drawing Figures

METHOD OF FILTERING A STICKY MATERIAL-CONTAINING EXHAUST GAS

The present invention relates to a method of treating a sticky material-containing exhaust gas. For example, during operation of a coke oven, gas having tar entrained therein leaks from the charging holes or the doors of the oven when opened. It is known to treat such a gas by using a dust scrubber, electrostatic precipitator, or dust collecting filter. However, a dust scrubber exhibits poor removal efficiency, an electrostatic precipitator involves the danger of explosion, and a dust collecting filter has the problem of filter clogging.

In the present invention, protective layers of pulverized coal or coke are formed on the surfaces of bagfilters to capture and retain sticky materials contained in such exhaust gas, e.g. tar, in order to prevent filter clogging by the sticky material in the dust collecting filter. Furthermore, in accordance with the present invention, the pulverized coal or coke containing the tar can be removed from the filters and charged into the coke oven again, making it unnecessary to discard it. This is economically very advantageous, and at the same time, since a closed system can be employed, there is no generation of industrial waste, and therefore no problem of pollution.

U.S. Pat. No. 4,010,013 discloses treatment of tar-containing exhaust gases by using pulverized coal or coke. However, such application does not suggest two of the critical features of the present invention relating to the particle size of the coal or coke and the manner in which the coal or coke is introduced into the system. These and other important distinctions between the present invention and the method described in U.S. Pat. No. 4,010,013 will be apparent from the description which follows.

Thus, the present invention comprises the steps of introducing pulverized coal or coke having a particle size of 0.3mm or less into the bottom of a hopper, which is positioned below, and integrally connected with, a bag-house containing bag-filters, to form a protective layer of pulverized coal or coke having a thickness of at least 1mm on the surface of each bag-filter, and then introducing the sticky material-containing exhaust gas into said hopper in a manner such that the gas passes through said protective layer while said protective layer captures and retains the sticky material.

The coal or coke (or mixture thereof) to be used in the present invention should have a particle size not greater than 0.3mm. That is, all or substantially all of the coal or coke particles should preferably have a diameter not greater than 0.3mm. However, it is also possible to use a mixture of coal or coke particles wherein some of the particles are larger than 0.3mm, with the critical proviso that at least 60% by weight of the mixture be particles having sizes not greater than 0.3mm.

Figure 1:
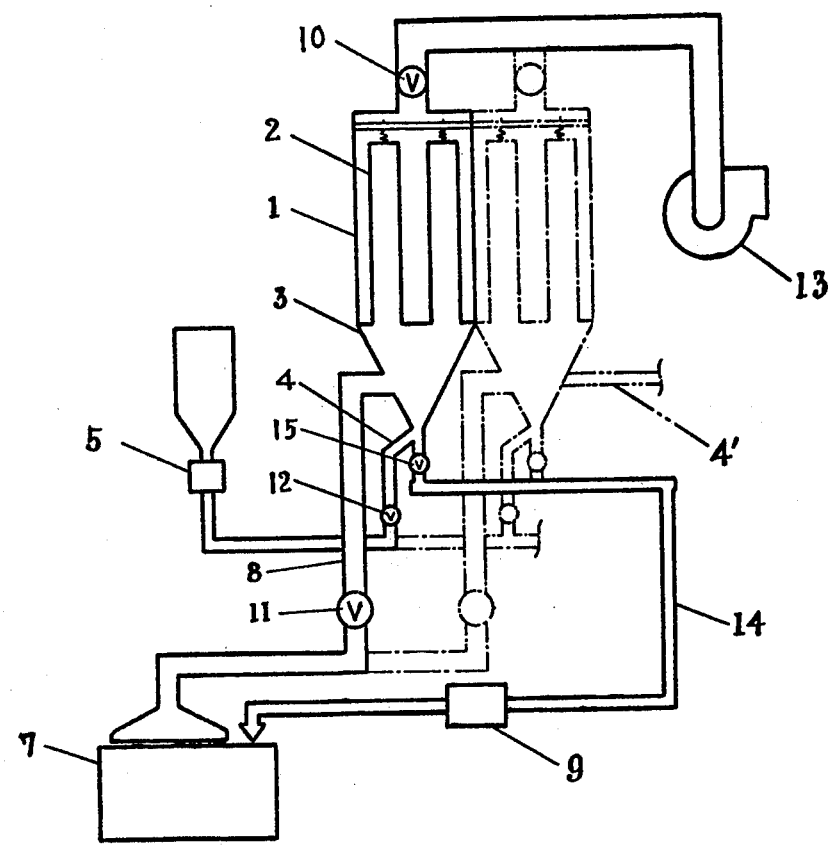
FIG. 1 is a longitudinal sectional view of an apparatus which can be used in carrying out the method of the present invention.
Figure 2:
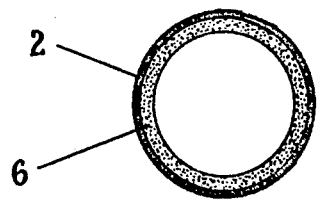
FIG. 2 is an enlarged transverse section of a bag-filter having a protective layer formed thereon.

It is also critical, in accordance with the present invention, that the coal or coke particles which are introduced into the hopper circulate through the hopper in a vertical rotary manner. The rotary motion of the particles within the hopper can be accomplished by introducing the particles into the hopper at the bottom of the hopper, as also shown in FIG. 1.

Turning now to a more detailed discussion of the invention, and with respect to the drawings, numeral 1 is a bag-house with bag-filters 2 contained therein and a hopper 3 provided below. A pulverized coal or coke supply pipe 4 is connected to the bottom of the hopper 3, and said supply pipe 4 is provided with a particle size adjusting device 5. The particle size adjusting device 5 pulverizes coal or coke to a particle size of 0.3mm or less. This pulverized coal or coke is introduced in admixture with air into the hopper 3 from the bottom of the hopper 3 through said supply pipe 4, so that the pulverized coal or coke circulates in a rotary flow in the hopper 3. In view of this rotary flow, the pulverized coal or coke gradually deposits onto the inner surfaces of the bag-filters 2. The rotary flow acts to raise again the pulverized coal or coke which has dropped down from the bag-filters 2 so that almost all of the coal or coke particles are deposited onto the bag-filters 2, improving efficiency considerably and resulting in a substantial saving on the amount of pulverized coal or coke initially employed.

The following table shows comparative deposition rates $$(\frac{\text{coal or coke deposited}}{\text{coal or coke supplied}} \times 100)$$

between the case (A) where, with the supply pipe 4 attached at the bottom of the hopper 3 in accordance with the present invention, the pulverized coal or coke circulates within the hopper 3 in a rotary flow, and the case (B) where, with the supply pipe 4' attached at the middle of said hopper 3 (as in the above-mentioned U.S. Pat. No. 4,010,013), as shown in FIG. 1, the pulverized coal or coke does not circulate within said hopper 3 in a rotary flow

| Case A | | Case B | |
|---|---|---|---|
| Pulverized coal | Pulverized coke | Pulverized coal | Pulverized coke |
| 90% | 90% | 10% | 10% |

Figure 3:
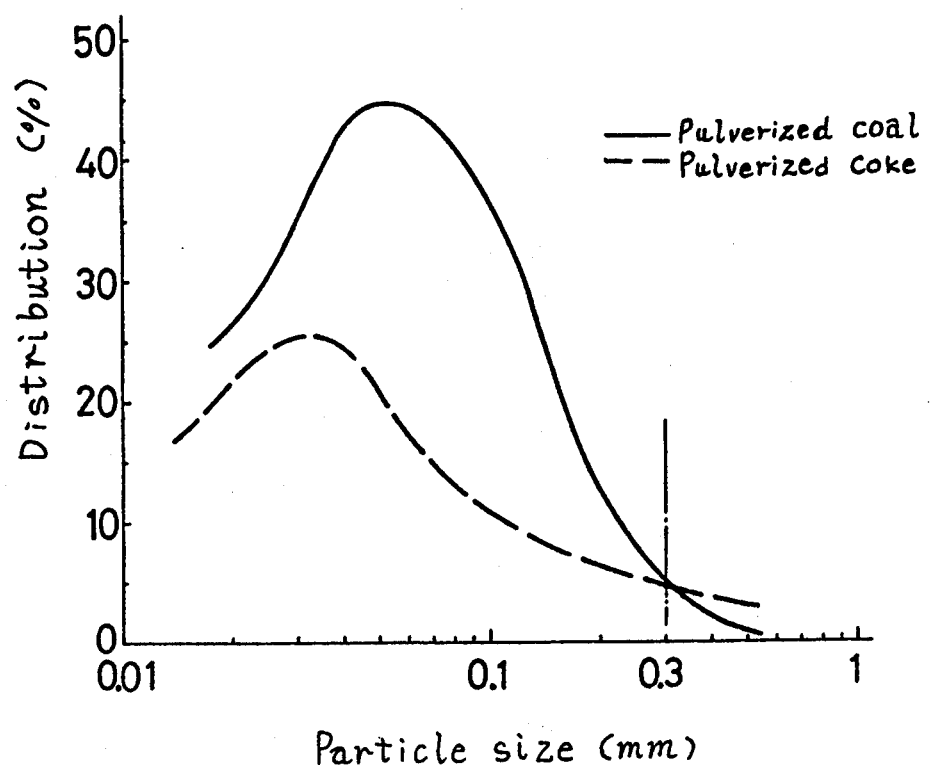
FIG. 3 is a graph showing particle size distribution for pulverized coal and coke which are supplied to the bag-filters for the formation of the protective layers.

It is therefore apparent that, in accordance with the present invention, the pulverized coal or coke is efficiently deposited onto the inner surfaces of the bag-filters 2, to form the protective layers 6. In this case, if coal or coke (or a mixture thereof) pulverized to a particle size of 0.3mm or less is used, or if a mixture of pulverized coal and/or coke is used wherein at least 60% by weight of the coal and/or coke particles have particle sizes of 0.3mm or less, the coal and/or coke is deposited onto the entire inner surfaces of the bag-filters 2 to form substantially uniform and very favorable protective layers 6. However, if more than 40% by weight of the particles have particle sizes greater than 0.3mm, such uniform deposition cannot be attained, resulting in unfavorable protective layers 6. For example, measurement of the coal and coke pulverized by the particle size adjusting device 5 showed the particle size distributions given in FIG. 3.

In addition, since the object of the protective layers is to protect the bag-filters 2, as well as to capture and retain the sticky material, the protective layers 6 must be at least 1mm thick. When the pulverized coal or coke is introduced from the lower ends of the bag-filters 2, the coal or coke is deposited in the bag-filters 2 in a partially vertical manner, that is, the layers are thick at the lower part of the bag-filters and become progressively thinner toward the upper part of the bag-filters. Unless the protective layers are at least 1mm thick, even at the thinnest portion of said layers, the object of the protective layers cannot be attained. The amount of pulverized coal or coke to be supplied to the hopper 3 is determined by giving consideration to this partially vertical manner of deposition and minimum thickness requirement.

After the protective layers 6 are formed on the inner surfaces of the bag-filters 2 as mentioned above, the exhaust gas with sticky material contained therein, for example, tar-containing exhaust gas from a coke oven 7, is introduced into the bag-filters 2 through the exhaust gas introducing pipe 8, to pass through the protective layers 6. This passage gradually accumulates the tar on the surfaces of the protective layers 6, and in time, thin tar films of about 0.5mm in thickness are formed on the surfaces of the protective layers 6. In this state, the pressure drop through the bag-filters 2 exceeds 300mm Aq (water), at which time removal of the protective layers is required. The time until these tar films are formed is proportional to the concentration of tar in an exhaust gas; as an example, it takes about 5 hours to form a 0.5mm thick tar film after introducing an exhaust gas having a tar concentration of about 100 mg/Nm$^3$.

The protective layers 6 are removed by any usual means, e.g. by reverse flow or shaking the bag-filters 2, and at this time, the tar films drop as flakes together with the protective layers 6. The pulverized coal or coke together with the tar is then discharged from a discharge pipe 14 through storage means 9, to be returned to the coke oven 7 as a raw material for producing coke.

It is of course possible to use plural bag-houses with bag-filters contained therein. In this case, alternate use of the bag-filters by means of valve operation provides a continuous method of treating the exhaust gas.

FIG. 1 is given only for convenience and as an example to explain the method of the present invention. The present invention is not limited thereto.

In FIG. 1, the numerals 10, 11, 12 and 15 designate valves. To form the protective layers 6, the valves 10 and 12 are opened and the valves 11 and 15 are closed, and the pulverized coal or coke is then drawn into the hopper 3 and bag-filters 2 by a blower 13. To remove the tar from the exhaust gas, the valve 12 is closed and the valve 11 is opened, and the tar-containing exhaust gas is introduced into the bag-filters 2 from the exhaust gas introducing pipe 8 by the blower 13.

The following table shows embodiments of the method of the present invention (Case "C" and "E"). Case "D" and "F," which are not included in the present invention, are also shown for the sake of comparison.

| Protective layer material | Case | Pulverized coal | | Pulverized coke | |
|---|---|---|---|---|---|
| | | C | D | E | F |
| Particle size distribution (weight % of particles 0.3mm or less) | | 80 | 40 | 80 | 40 |
| Supply amount (kg) | | 12 | 12 | 12 | 12 |
| Filtration velocity (m/min) | | 1.2 | 1.2 | 1.2 | 1.2 |
| Protective layer thickness (mm) | Upper part of bag-filters | 1.0 | 0.5 | 1.0 | 0.5 |
| | Lower part of bag filters | 3.0 | 4.0 | 3.0 | 4.0 |
| Pressure drop through bag-filters (mm Aq) | Before protective layer formation | 30 | 30 | 30 | 30 |
| | After protective layer formation | 120 | 80 | 200 | 140 |
| | When the introduction of a sticky material-containing exhaust gas has terminated | 300 | 300 | 300 | 300 |
| | After removal of protective layers | 30 | 170 | 30 | 190 |
| Sticky material | | Tar | Tar | Tar | Tar |
| Concentration of sticky material in exhaust gas (mg/Nm$^3$) | | 120 | 112 | 115 | 108 |
| Time taken for introducing the sticky material-containing exhaust gas (hr) | | 5.0 | 0.6 | 5.2 | 0.7 |
| Sticky material removal rate (%) | | 99.7 | 80.0 | 99.8 | 85.0 |

Note:
Bag-filter: 292 mm (diameter) × 1800 mm (length) × 3 (no. of bag-filters)
Bag-filter material: Synthetic fiber (Polyester multi-filament yarns)
Filtration velocity: a measure of rate of flow (m$^3$/min/m$^2$ based on the filter area) in forming protective layer and introducing exhaust gas As described above, because of the rotary flow of pulverized coal or coke in the hopper to form the protective layers for filtration on the surfaces of the bag-filters, the present invention allows a quantitative saving of pulverized coal or coke. Besides, almost complete capture and retention of sticky material, such as tar mist, can be accomplished. In addition, after the protective layers, with the sticky material caught thereon, are removed, the pressure drop through the bag-filters returns to essentially the same value as before formation of the protective layers, thus allowing very smooth repetitive operations. Furthermore, the pulverized coal or coke, with the tar caught thereon, can then be charged into the coke oven as it is, as a raw material for producing coke, and this method is therefore economically advantageous, and at the same time, does not generate industrial waste.

The present invention is also effectively applicable to removal of sticky materials from gases which contain such sticky materials, exhausted, for example, from carbon electrode manufacturing plants, plants for producing deliquescent chloric fertilizers, and plants using printing inks, aside from the coke oven as mentioned above. Preferably, the concentration of sticky material, e.g. tar, in the exhaust gases is less than 5000 mg/Nm$^3$. For example, the concentration may be 50–5000 mg/Nm$^3$, although the present invention is applicable to concentrations above and below this range.

We claim:

1. A method of treating a sticky material-containing exhaust gas to remove the sticky material therefrom, which comprises introducing a mixture of pulverized coal and/or coke particles, at least 60% by weight of which have particle sizes of 0.3mm or less, into the bottom of a hopper by means of a supply pipe connected to the bottom of said hopper, said hopper being positioned below, and integrally connected with, a bag-house containing at least one bag-filter, to cause a vertical rotary flow of pulverized coal and/or coke particles in said hopper and to gradually deposit and form a protective layer of pulverized coal and/or coke having a minimum thickness of at least 1.0mm on the surface of each bag-filter, and introducing the sticky material-containing exhaust gas into said hopper in a manner such that the gas passes through said protective layer while said protective layer captures and retains the sticky material.

2. A method according to claim 1, wherein substantially all of said particles have a particle size of 0.3mm or less.

3. A method according to claim 1, wherein said particles are introduced into the hopper in admixture with air.

4. A method according to claim 1, wherein the thickness of the protective layer progressively decreases from the bottom of the bag filters toward the top of the bag filters.

5. A method according to claim 1, wherein the bag-filters are composed of polyester multi-filament yarn.

6. A method according to claim 1, wherein the concentration of sticky material in the exhaust gas is 50–5000 mg/Nm$^3$.

7. A method according to claim 1, wherein the sticky material-containing exhaust gas is tar-containing exhaust gas from a coke oven.

8. A method according to claim 7, which further comprises removing the protective layer, having the tar retained therein, from the bag-filters, and introducing said protective layer and tar into the coke oven as raw material.

* * * * *